United States Patent [19]

Rando et al.

[11] 4,030,832

[45] June 21, 1977

[54] AUTOMATIC GRADE ROD AND METHOD OF OPERATION

[75] Inventors: Joseph F. Rando, Cupertino; Arthur Sobel, Los Altos Hills; Richard W. Davidson, Santa Clara, all of Calif.

[73] Assignee: Spectra-Physics, Inc., Mountain View, Calif.

[22] Filed: Feb. 10, 1975

[21] Appl. No.: 548,607

[52] U.S. Cl. .................................. 356/152; 33/293; 33/294; 356/4; 356/172
[51] Int. Cl.² .................. G01B 11/26; G01C 3/08; G01C 15/06
[58] Field of Search .................. 356/1, 4, 152, 172, 356/156; 33/293, 294, 1 H

[56] References Cited

UNITED STATES PATENTS

| | | | |
|---|---|---|---|
| 2,713,722 | 7/1955 | Henderson | 33/294 |
| 3,494,426 | 2/1970 | Studebaker | 172/4.5 |
| 3,527,539 | 9/1970 | Studebaker | 356/156 |
| 3,588,249 | 6/1971 | Studebaker | 356/4 |
| 3,790,277 | 2/1974 | Hogan | 356/152 |
| 3,819,273 | 6/1974 | Unema | 356/172 |
| 3,857,639 | 12/1974 | Mason | 356/172 |
| 3,894,230 | 7/1975 | Rorden | 250/203 R |

Primary Examiner—Maynard R. Wilbur
Assistant Examiner—S. C. Buczinski

Attorney, Agent, or Firm—Flehr, Hohbach, Test, Albritton & Herbert

[57] ABSTRACT

A grade rod and method of operation for use in a surveying system employing a laser beam which is rotated in a plane. A flexible tape formed with a graduated scale is mounted for movement in a loop within the housing. A slider on the tape carries a pair of closely spaced-apart light detectors as well as electronic circuitry which discriminates between laser beam pulses and sunlight. Output signals from the circuitry on the slider are fed into a control circuit in the housing through a flexible cable which is carried in a traveling loop. Scale indicators are mounted for movement with the slider along a fixed scale which is provided on the housing, and a manually operated cursor is mounted for movement along the housing. The control circuit includes means for driving the tape and slider in a search mode until a light pulse from the laser hits a detector, and then in a track mode for centering the detectors on the plane of the laser beam. A circuit is provided for returning the slider to its home position should the beam be interrupted for a period of time, and also for returning the slider to its home position should no laser beam be detected. A stutter-start circuit is employed for operation in a track mode for a short time period after activation before switching to the search mode.

21 Claims, 8 Drawing Figures

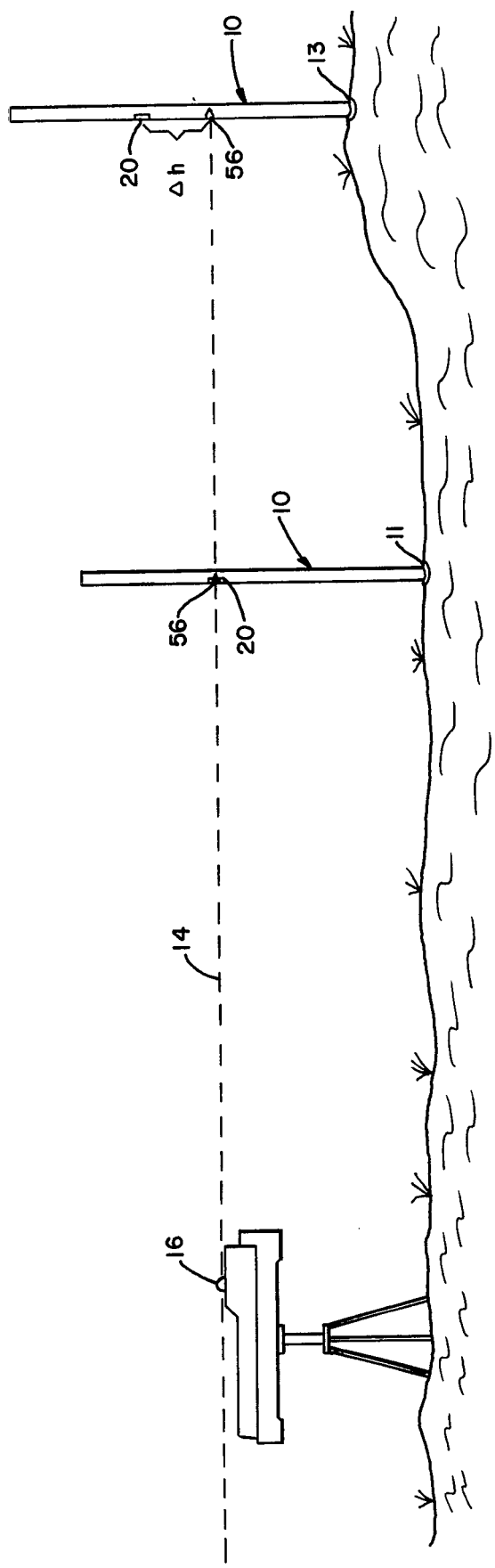
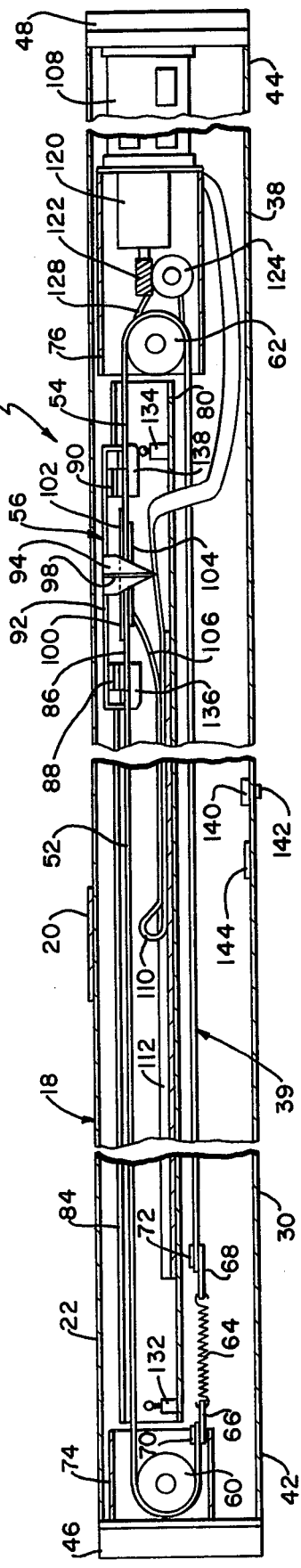
FIG.—1
FIG.—3

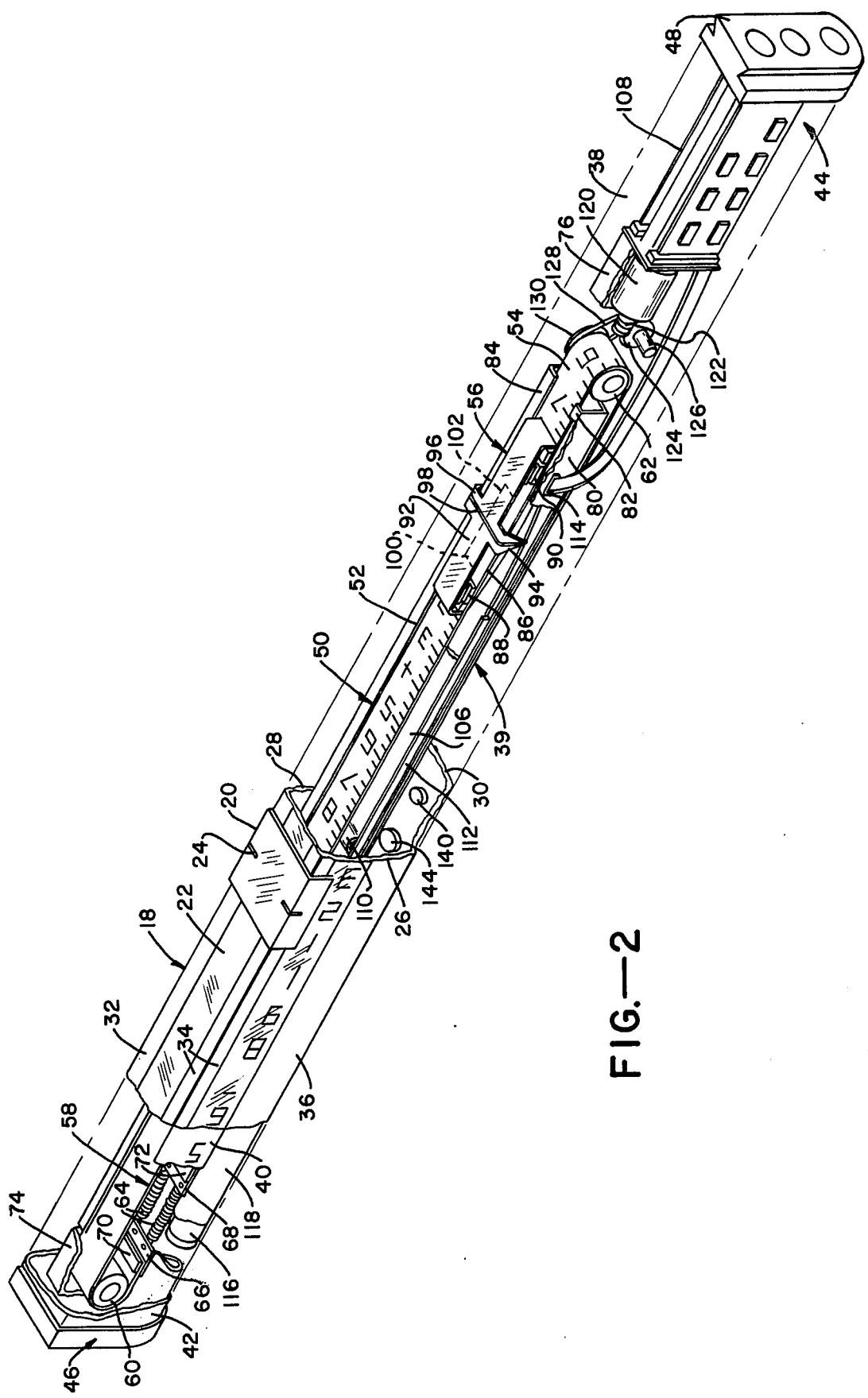

FIG.—5

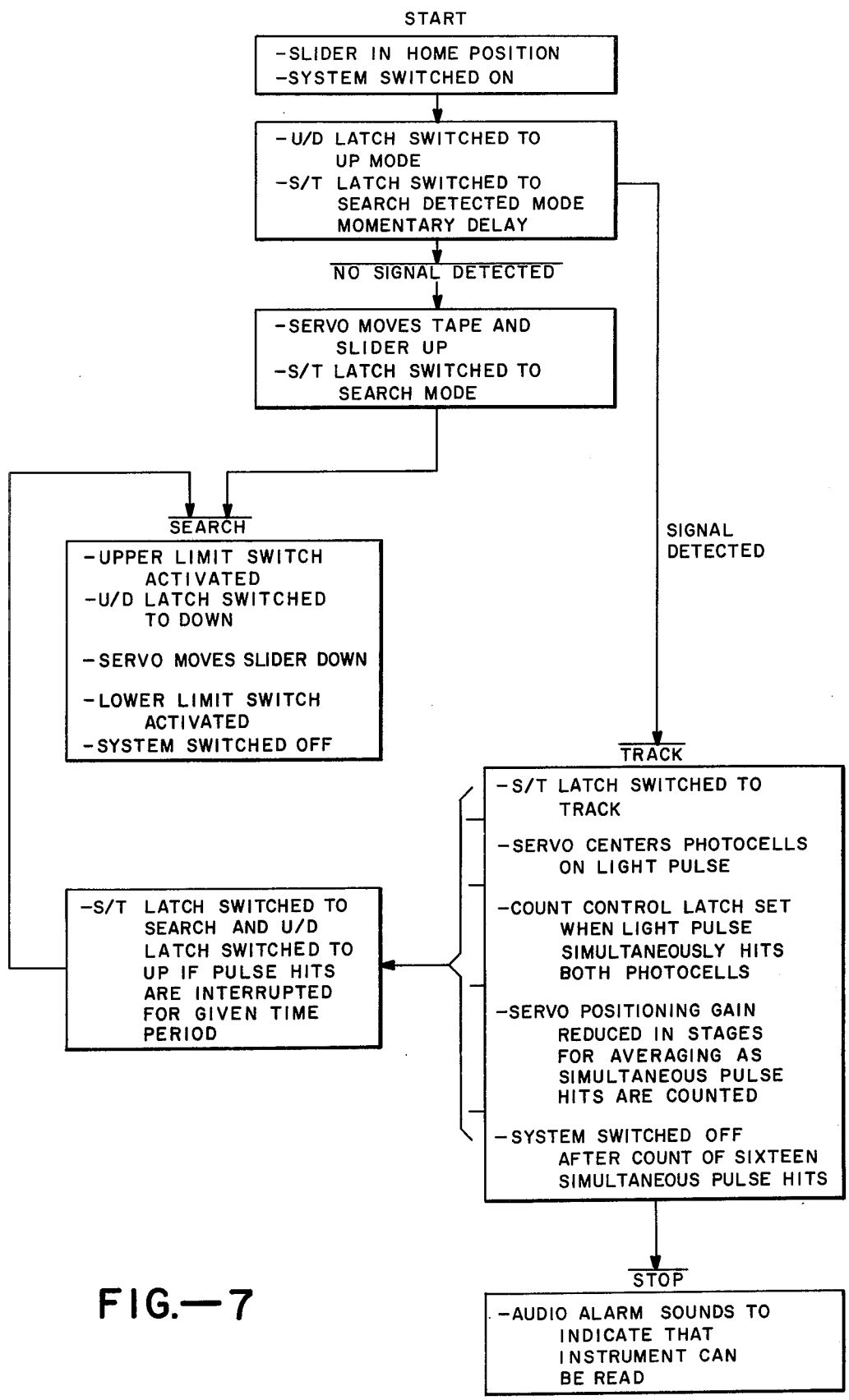
FIG.—7

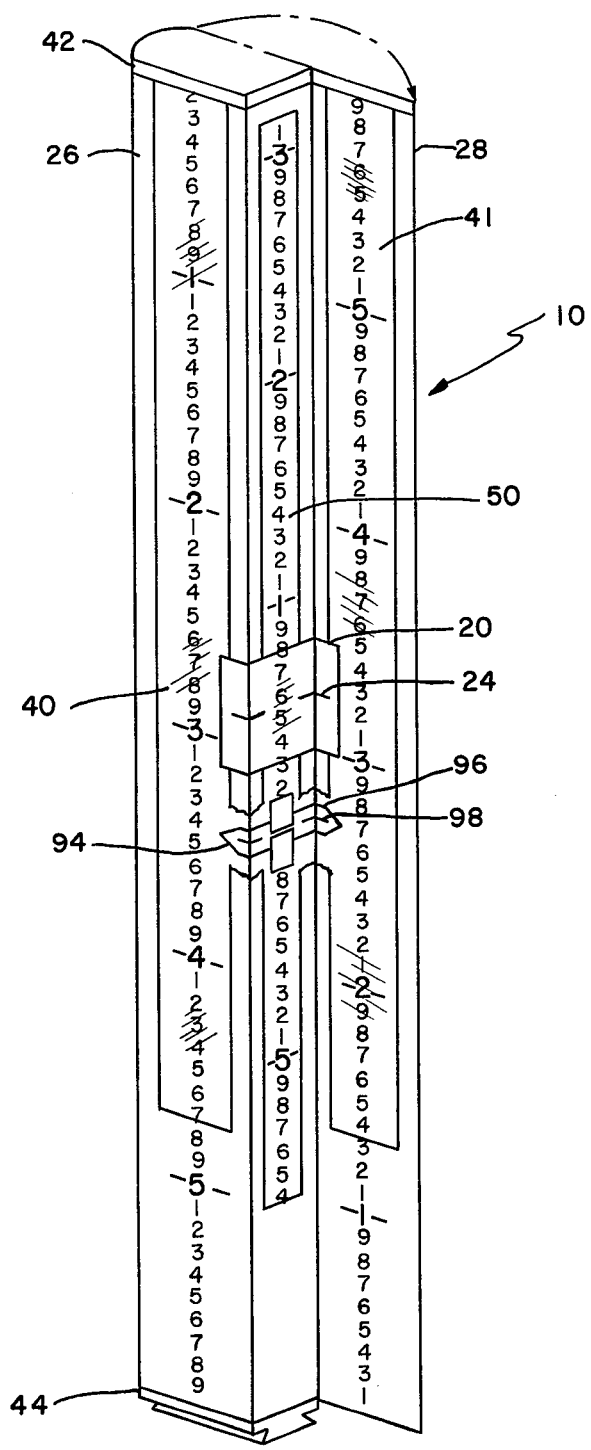
FIG.—8

AUTOMATIC GRADE ROD AND METHOD OF OPERATION

BACKGROUND OF THE INVENTION

This invention relates in general to surveying instruments and procedures, and in particular relates to surveying systems which employ the use of laser beams for purposes such as measuring elevation and grades.

It is common practice in civil engineering and in the construction industry to measure elevations and grades by means of a level or transit used in combination with a leveling rod, such as a Philadelphia rod, linker rod or geodetic rod. In the use of such instruments, two operators are required, one for manipulating the level and the other for holding the rod. Measurements taken by the use of such instruments are subject to a number of inaccuracites and errors, such as from design limitations in the instruments and from misreadings by the operators.

Laser beam systems have also been employed in elevation leveling and grade measurements. One such system provides, in place of the level, a laser beam which rotates in a level or graded plane. The elevation of a point remote from the laser device is measured by use of a rod on which a laser beam detector, including a readout meter, is mounted for manual sliding movement along the rod. The operator moves the detector along the rod to a position at which it is intercepted by the laser beam, as indicated by the meter which is visually read. Such systems are available from Spectra-Physics, Inc. of Mountain View, Cal. under the designation Laser Eye (TM) Grade Tool and Detector. While such systems provide many improvements over the conventional level and rod system, particularly in certain construction projects involving repetitive checking of grade for accuracy, it also presents certain disadvantages and limitations. For example, measurement accuracy is compromised because of the reliance on the operator's skill and judgment in properly positioning and reading the meter. Where used in more accurate and difficult measurement operations, as in elevation surveying, considerable time is required for the surveyor to set up the device and take each measurement. Thus, there is a requirement for a surveying system which will overcome the problems and limitations of existing systems.

OBJECTS AND SUMMARY OF THE INVENTION

It is an object of this invention to provide a laser surveying system employing a new and improved grade rod and method.

Another object is to provide a system of the type described in which elevations and grades are measured by means of an automatic light beam detector which is carried within a self-contained, portable grade rod.

Another object is to provide a system of the type described in which the grade rod can be used by a single operator in a manner which facilitates the rapid and simple determination of the intersection of the plane of a rotating laser beam with the rod.

Another object is to provide a system of the type described in which the grade rod includes a graduated scale on a movable tape connected with a light detector such that the tape and detector are automatically controlled in their movement to accurately center on the plane of the laser beam.

Another object is to provide a system of the type described employing a control circuit which discriminates between laser beam pulses and incident sunlight, thereby removing the requirements for shading the instrument and employing special light filters.

Another object is to provide a system of the type described which moves the light detector in a search mode for seeking an initial light pulse from the laser beam and thereafter in a track mode for accurately centering the detector on the plane of the laser beam.

Another object is to provide a system of the type described in which the light detector employs a pair of closely spaced-apart photocells and in which the control circuit is adapted to move the photocells in a track mode seeking a position in which the light pulses simultaneously impinge upon the photocells along their separating gap.

Another object is to provide a system of the type described which detects the differential amplitude between light signals received by the spaced-apart photocells and integrates this differential to produce an output velocity signal for moving the light detector toward the beam centered position.

Another object is to provide a system of the type described in which false readings are minimized by the employment of a control circuit which returns the detector to a home position if the laser beam is interrupted for any reason, or if no laser beam is detected during the search mode of operation.

Another object is to provide a system of the type described in which the control circuit in the track mode reduces in stages the gain of the slider positioning signal as simultaneous light pulses are counted. This provides for an averaging action in detecting the beam to minimize the effects of any variations or perturbations in the beam path, such as could be caused by atmospheric conditions, e.g. rising heat waves.

Another object is to provide a system of the above character which can be operated in continuous track mode whereby the grade rod can be attached to a structural object being positioned and used thereon as a continuous reference indicator while the structural member is moved toward a pre-determined position.

The system of the invention employs a leveling or grade rod comprising an elongate housing in which a flexible tape carrying a graduated scale is reeved about a pair of pulleys for movement in a loop. The tape carries a slider which mounts a pair of closely spaced-apart light detectors as well as electronic circuitry for discriminating between laser beam pulses and sunlight. Output signals from the slider circuitry are directed through a flexible cable mounted in the housing in a traveling loop which leads to a control circuit carried in the housing. Indicators are mounted for movement with the slider relative to a fixed scale provided on the housing. The control circuit operates a drive motor which is arranged to drive the slider back-and-forth along the length of the rod. A circuit is provided for moving the tape and slider in a search mode for initially seeking the laser beam, with the slider being returned to home position if no beam pulse is detected. After a beam pulse is detected the circuit switches to a track mode for centering the slider on the beam. In the track mode the amplitudes of the signals from the two detectors are compared and the differential is integrated with the resulting output providing a velocity signal for moving the slider in the required direction and speed for rapid beam centering. A circuit is provided for counting the number of light pulses received by the detectors and the gain of the slider positioning signal is reduced in stages as an increasing number of light pulses are counted. The system is shut off when a pre-determined number of pulses is counted so that the slider is stopped at a position accurately centered on the beam.

Additional objects and features of the invention will appear from the following description in which the preferred embodiments have been set forth in detail in conjunction with the accompanying drawings.

BRIEF DESCRIPTION OF THE DRAWINGS

FIG. 1 is an elevational view illustrating a grade rod of the invention shown in use in a typical surveying procedure;

FIG. 2 is a perspective, partially brokenaway, view of the rod of FIG. 1;

FIG. 3 is a longitudinal section view of the rod of FIG. 1;

FIG. 7 is a flow sheet diagram illustrating the operation of the system of the present invention; and FIG. 8 is a perspective view of the grade rod of the invention showing its rear side as being folded forward, for purposes of clarity.

DESCRIPTION OF THE PREFERRED EMBODIMENTS

Figure 4:
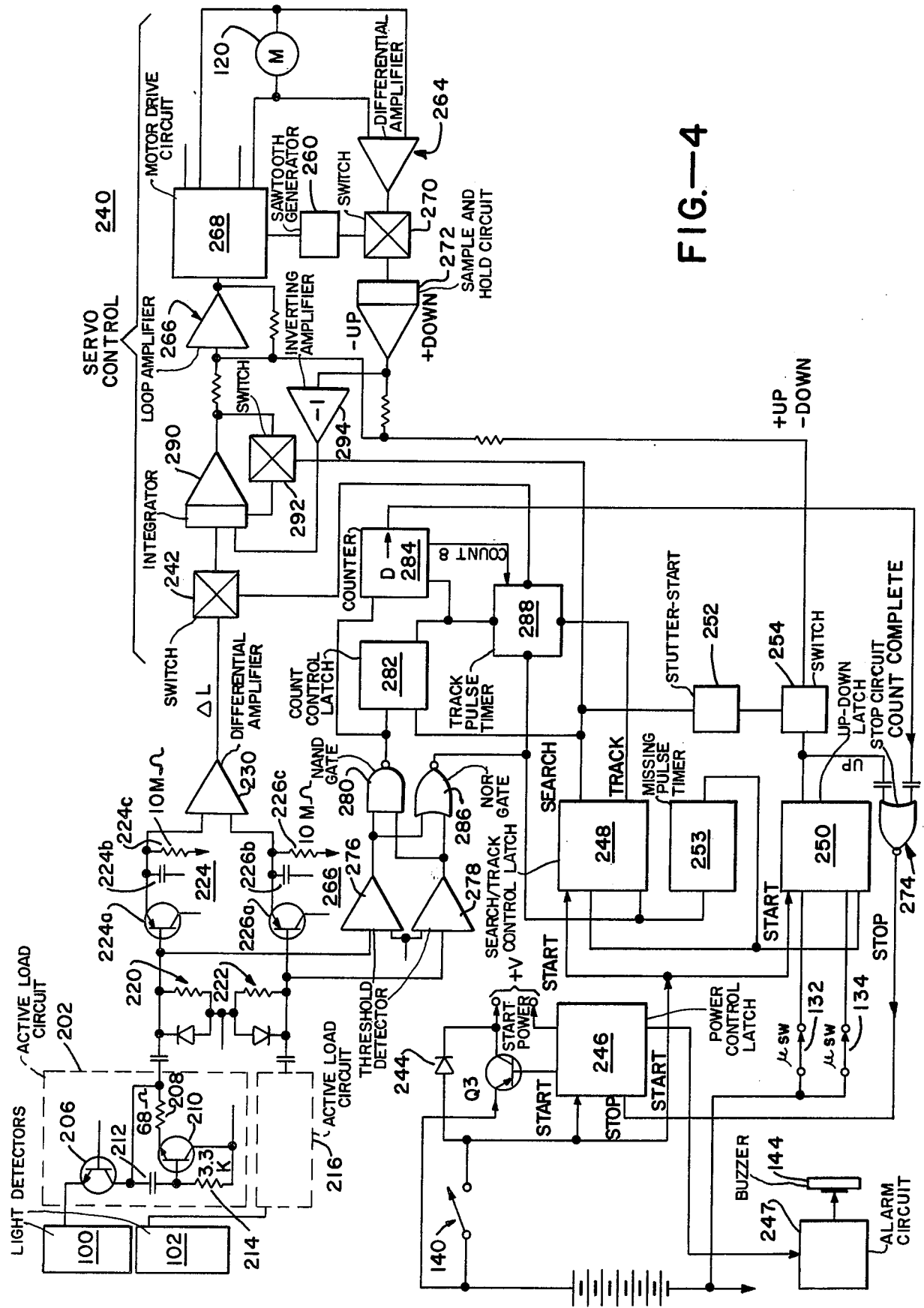
FIG. 4 is a circuit in block diagram form of the operating circuitry of the grade rod of FIGS. 1 and 2.

In the drawings, FIG. 1 illustrates generally at 10 a leveling or grade rod of the invention shown in use with a laser beam generator 12 for surveying purposes. Preferably the laser beam generator incorporates a rotating head 16 adapted to project a laser beam 14 which is modulated by being rotated through a plane at a given frequency, preferably in the range of three to five cycles per second. The laser beam could also be modulated by being swept back and forth through an arc. The laser beam plane can be set horizontal, vertical or at any pre-determined grade angle. Beam generator 14 incorporates a laser tube containing a suitable active gas such as a helium-neon gas which produces a low-power collimated output beam in the red band of the light spectrum.

Grade rod 10 will be described for use in determining and measuring elevations and grades for purposes such as surveying and construction work. It is understood, however, that the invention will also find application in other procedures where a measurement is to be taken from a reference which can be established from the plane of a rotating laser beam.

Grade rod 10 is shown in greater detail in FIGS. 2 and 3. The rod includes an elongate hollow housing 18 of a length on the order of 6' and which is formed of a suitable high-strength durable transparent material, such as the synthetic polymer sold under the trademark Lexan. A manually operated cursor 20 having a generally U-shaped configuration is mounted for movement along the length of the planar side 22 of the housing in a path generally transversely of the laser beam plane. The cursor is generally transparent for observing the underlying scales, and fiducial scribe marks 24 are formed in its surface for positioning and scale reading purposes.

The opposite planar sides 26 and 28 of the housing extend parallel from side 22 and are joined by a generally U-shaped side 30. Opaque portions 32, 32 and 36 are formed, as by layers of paint, along the edge margins of sides 22, 26 and 28 so that elongate transparent viewing windows are defined between the opaque portions. The lower portion 38 of the housing, of a length of approximately 14 inches, is opaque on all sides so as to enclose the main control circuitry and components. The lower portion of the housing also provides a home or stop position for the slider assembly.

A beam detector and traveling tape assembly 39 is mounted within housing 18. The assembly 39 is adapted to be slidably withdrawn and reinserted longitudinally through the lower housing end 44 for purposes of installation, and for maintenance or battery replacement. A pair of fixed scales 40 and 41 are mounted along the length of assembly 39 adjacent the sides 26, 28. Preferably these fixed scales comprise elongate rigid tapes printed or otherwise marked with suitable graduated scale indicia which can be observed through the transparent viewing windows. The opaque lower portions of sides 26 and 28 are printed or marked with continuations of the scales 40. Preferably the scales 40 and 41 display decimal linear measurement of either metric or English units. The cardinal numbers of the scale 40 run downwardly from zero at housing upper end 42, while the cardinal numbers of the opposite scale 41 run upwardly from zero at lower end 44. Upper end 42 is closed and sealed by means of an end cap 46 while lower end 44 is closed and sealed by a base plate 48 which is attached to the end of assembly 39.

The assembly 39 further includes an elongate flexible tape 50 formed of a suitable material such as thin-sectioned spring steel which is mounted within housing 18 in facing relationship with side 22. The tape comprises an upper section 52 and lower section 54 which are joined at their ends by a slider assembly 56 and tensioning unit 58 to form a continuous loop. The tape loop is reeved between a pair of pulleys 60, 62 for moving the slider back and forth along the outer run of the tape. Tension unit 58 imparts a pre-determined tension force in the tape and comprises a pair of coil springs 64 which are mounted between connecting blocks 66, 68 secured to respective ends of tape sections 52 and 54. A pair of counterweights 70, 72 are mounted on the same ends of the tape sections for purposes of dynamically balancing the weight of slider 56. Pulley 60 is rotatably mounted to the upper end of assembly 39 by a bracket 74, and pulley 62 is rotatably mounted to the lower end by a bracket 76.

The outwardly facing surface of tape 50 is formed with suitable graduated scale indicia which can be read through transparent panel 22. Preferably the tape scale displays decimal linear measurement of either metric or English units. The zero mark of the scale is centered on slider 56, and the cardinal numbers run upwardly along tape section 52 and continue about the loop along tape section 54 to terminate at the slider.

A U-shaped channel 80 is provided in assembly 39 between the opposite runs of tape 50, and the pulley brackets 74 and 76 are mounted at opposite ends of this channel. The inwardly turned edges 82, 84 of the channel project over the top side margins of the outer tape run.

Slider assembly 56 includes a flat elongate carriage 86 which is secured at its opposite ends by suitable fasteners to the adjacent ends of tape sections 52 and 54. A pair of guide blocks 88, 90 are mounted on the ends of the carriage, and longitudinal grooves are formed along opposite sides of the blocks for sliding engagement with the U-shaped channel edges 82 and 84 so that the slider is constrained and guided for movement in a linear path along the grade rod. The slider assembly carries an elongate generally U-shaped light filter 92 which is mounted across the upper surfaces of blocks 88 and 90. Preferably filter 92 is formed of a translucent synthetic polymer, such as red Lexan, which selectively transmits light within the red band of the spectrum and thereby reduces the instrument's sensitivity to sunlight. A pair of outwardly and downwardly projecting pointed indicators 94, 96 are formed integral with filter 92, and the indicators are positioned to extend over the outer sides of U-channel 80 and over the fixed scales 40. The position of the slider assembly relative to the fixed scales can thereby be observed from outside through the transparent windows formed in sides 26 and 28. A transverse groove 98 is formed across the upper surface of filter 92 and along the indicators to serve as a fiducial or scribe mark for quickly taking accurate readings.

Slider assembly 56 includes a pair of light sensors or detectors 100, 102 which are mounted on carriage 80 below filter 92. Preferably the light detectors comprise suitable photocells, such as reverse biased PN junction photocells. The photocells are spaced apart along the length of the carriage a distance which is less than the width of the incident laser beam so that the beam can simultaneously impinge upon the two photocells along their gap when the plane of the rotating beam is at or near the longitudinal mid-line of the slider. Electronic circuitry forming a part of the control circuit of FIG. 4 is incorporated within a suitable printed circuit board 104 which is mounted on the underside of slider 56 to provide active loads for each photocell. The active loads of this circuitry exhibit a low impedance to DC signal components from the photocells, which result from incident sunlight, and a high impedance to AC signal components, which result from the rotating beam. This reduces the sensitivity of the circuit to sunlight so that the photocells can be used in sunlight without the requirement of expensive selective wavelength light filters.

Figure 5:
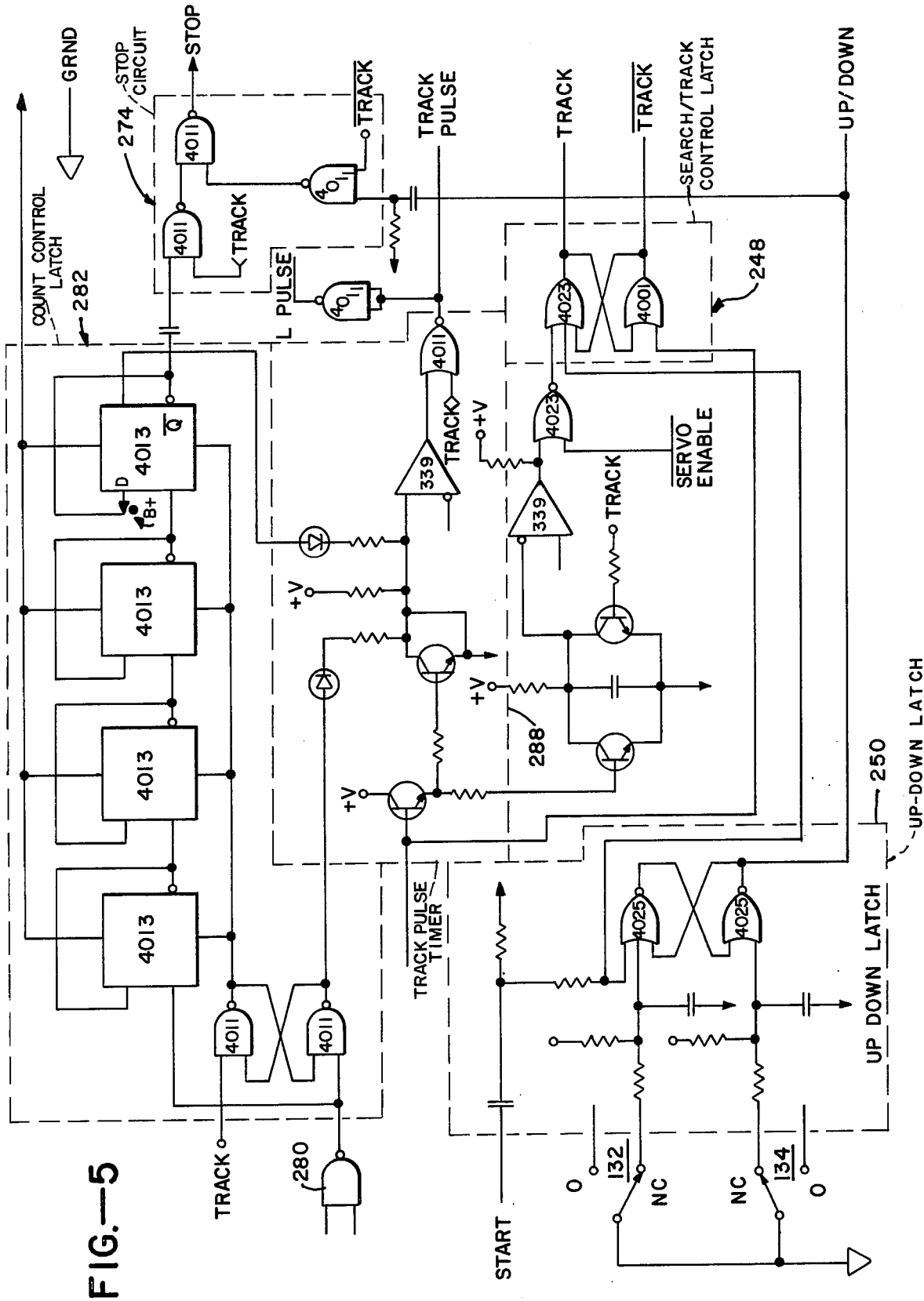
FIG. 5 is a more detailed circuit diagram of the control circuits of FIG. 4.
Figure 6:
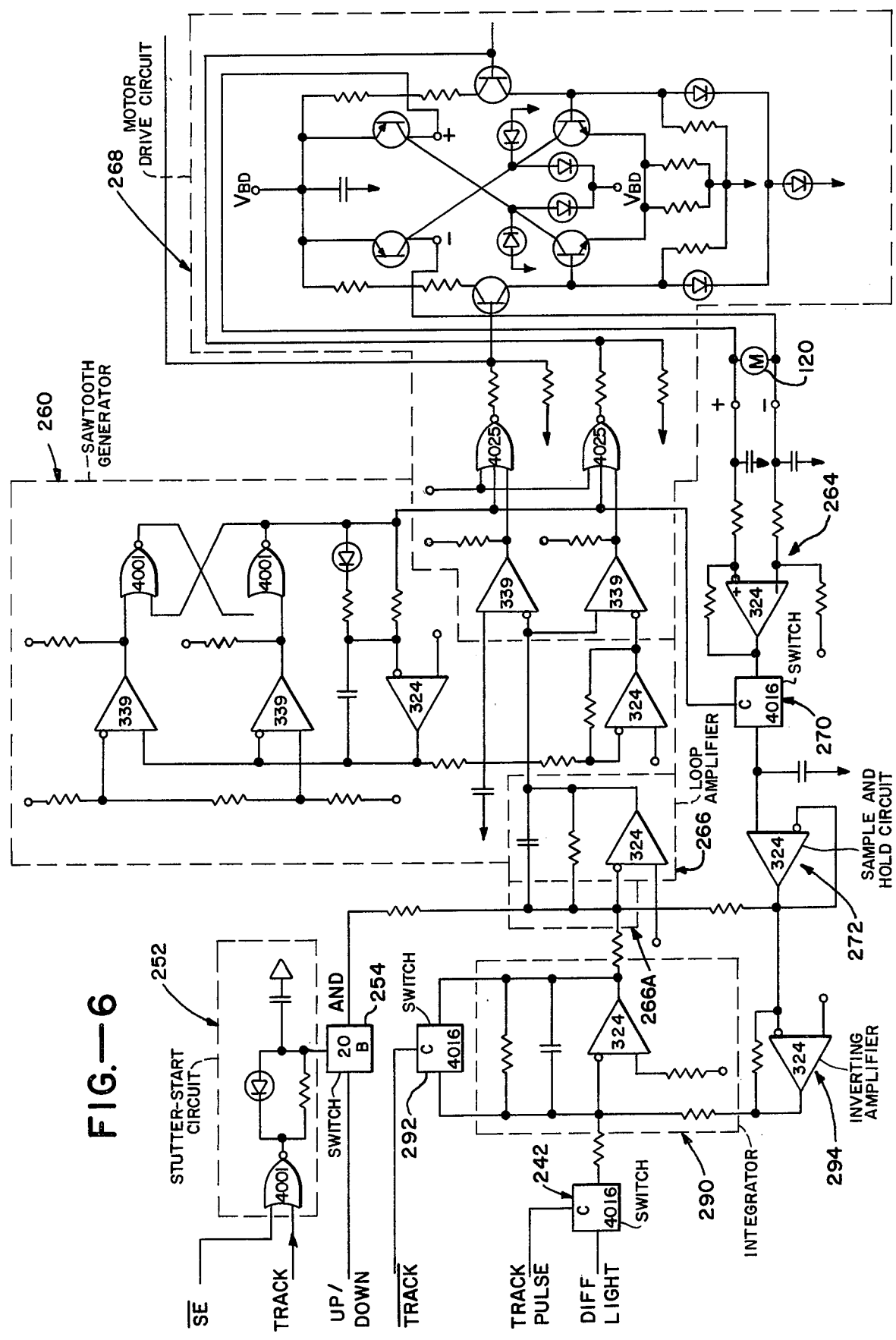
FIG. 6 is a more detailed circuit diagram of the servo drive.

A flat flexible cable 106 is provided to interconnect the photocell circuitry of slider 56 with printed circuit board assembly 108 which is mounted within housing end 44 and which incorporates the main control circuit of FIGS. 4–6. Cable 106 provides ground and DC power supply to the slider, and transmits output signals from the photocell circuitry to the main control circuit. The cable is carried in a traveling loop 110, which eliminates sliding friction during tape movement while providing positive noiseless electrical connection between the slider circuits 104 and the circuit board 108. The traveling loop is guided within a U-shaped channel 112 which is mounted on the inside of channel 80. Cable 106 exits from channel 80 through a rectangular slot 114 and then continues along the housing where it is connected with printed circuit board 108.

Power to operate the control circuit is derived from suitable dry cell batteries 116 carried within elongate open ended tubes 118 which are mounted along the upper end of assembly 39. Preferably the batteries provide a 12 VDC power supply to the control circuit. The batteries are installed or replaced by withdrawing assembly 39 from the housing, thereby exposing the open ends of the battery tubes. Suitable conductors, not shown, are provided to couple the batteries into the circuit board 108.

Tape 50 and slider 56 are moved back and forth along the rod by mans of a suitable motor 120 which is operated under influence of the control circuit. Motor preferably comprises a reversible, DC powered electric motor which is mounted to the lower end of assembly 39 by means of a bracket 76. The motor drives tape 50 through a suitable drive train which includes a worm gear 122 coupled with the output shaft of the motor and which is in driving engagement with a worm wheel 124 carried on a countershaft 126. The countershaft drives a flexible belt 128 through a suitable pulley, not shown, and the belt in turn is reeved around a pulley 130 which is mounted for rotation with pulley 62.

The tape and slider are reversed in direction when they reach their upper and lower limits of travel by means of respective upper limit switch 132 and lower limit switch 134. The limit switches are mounted within channel 80 and are positioned so as to be actuated by one or more cams 136, 138 which are mounted below the ends of slider carriage 86.

The control system of the invention is switched on by means of a normally-open start switch 140 mounted through an opening in housing side 30 and which in manually operated by means of a pushbutton 142. Following activation of the system by the pushbutton the control circuit assumes command and operates to center slider 56 on the plane of the laser beam, at which point the system is automatically switched off. At the time the circuit is switched off a suitable visual or audio alert signal is generated for indicating that the slider has centered on the beam so that the instrument can be read. In the illustrated embodiment the alert signal is generated from an audio buzzer 144 which is mounted along the inside of the housing side 30. The buzzer 144 and start switch 140 are connected through suitable conductors with the circuit board 108.

Referring now more particularly to FIGS. 4 through 6, there will now be described the circuitry of the present invention, both that contained on circuit board 108 and that contained on circuit board 104 located on the slider, which together form the control circuits of the present invention. Thus, as shown in FIG. 4, the light sensors 100 and 102 are each respectively connected to the input of one of active load circuits 202, 216, only one of which is shown in detail. The purpose of the active load circuit is to allow the fast pulses or AC signals to pass while blocking DC signals caused by ambient sunlight and the like. The emitter of a transistor 206 is connected to the sensor and has its collector connected to the output side of a low value resistor 208 (68ohms), the other side of which is connected to a high beta transistor 210. In the presence of DC ambient signal, the system appears as a 60 ohm resistance in series with current caused by the DC signal. This is a rather small value. However, if an AC signal is received, it is shorted across the resistor 208 to the base of transistor 210 and through a 0.1 microfarad capacitor 212. This signal received at the base of transistor 210 pulls the base junction into a negative value so that the combined resistance in the system now appears principally due to the 3.3k ohm resistance 214 in the base collector circuit of transistor 210. The resulting change of impedance is quite high, of the order of 50:1 and provides a similar 50:1 reduction of the sensitivity of the load to DC as against an arriving AC pulse signal. The total amplification provided by this stage is approximately unity so that signals appearing at the output of the stage experience a change of a factor 50 in the impedance depending upon whether they are AC or DC. By utilizing such a stage, ambient light such as sunlight is prevented from saturating the system in that even while several volts of sunlight could be present, it is not passed from the active load in significant amounts; whereas, a fast AC pulse is passed onto the following stage. In a similar way, an active load 216 consisting of the same circuit elements as previously described with respect to load 202 provides an output for the second photocell detector 102.

The output of each respective active load are passed through respective ones of limiting stages 220, 222 consisting of a DC blocking capacitor followed by a limiting diode circuit which causes the signal passed to be limited to approximately ½ volt. The duration of the incoming pulse is normally about 10 to 100 microseconds and is a direct function in a rotating beam system, i.e., the beam sweep rate crossing the path of the detector. However, it should be realized that an equivalent system could be substituted for that specifically disclosed herein which would be more adapted to sense a modulated beam which, for example, was spread through a plane but had an intensity which varied with time as by amplitude modulation. In such a system, the input stage from the detector could consist of a high pass filter or other means for selective tuning to a specific frequency of modulation.

A further function of the limiting stages 220, 222 is normalization. That is to say, if the signal has a greater magnitude than a given value, these stages tend to generate a logarithm of the size of the signal. It turns out that this logarithm has an important relationship under circumstances where large signals are balanced against each other; that is to say, from 1 to 10 times each other in strength, as happens when a large signal $S_1$ is received from one photo detector and a small signal $S_2$ from the other photo detector. It permits the difference in signal output from the limiting stage to be proportional to log $S_1$ - log $S_2$, which can also be restated as the log $(S_1/S_2)$. This tends to be constant as a function of laser power and, therefore, permits standard circuits herein to operate over a wide range of input power pulses.

The output of each of the diode limiting stages 220, 222 is then passed through respective one of peak detection stages 224, 226. This stage is necessitated in the present embodiment because the speed of operation of much of the following circuitry is relatively slow so that were each pulse directly applied to such circuitry would be difficult to sense or follow it. Accordingly, the peak detection stage consists of a transistor 224a, 226a driving a parallel capacitor 224b 226b and charging it up to a given value based upon the peak pulse signal received. The capacitor is discharged relatively slowly through parallel 10 meg. ohm resistance 224c, 226c. During most of the operation of the device, one of the signals is smaller than the other and tends to discharge somewhate more slowly and, therefore, there will be a constant difference between the two signals in the decay value of the saw tooth waveform which is generated across the capacitor. In view of the relatively high input impedance presented by the output of the peak detection stage, a follower circuit (not shown) is employed to change that impedance and prevent loading of the peak hold circuit stages by the following differential amplifier stage 230 to which the signal is applied, the output of which is a signal $\Delta L$ representative of the difference in light signals received by the two photo detectors.

Accordingly, the difference in the output values of each of the peak hold circuits is relatively constant so that the differential light signal which appears at the output of the differential amplifier maintains a relatively constant value notwithstanding the decay of the individual values as appear across capacitors 224b, 226 b.

The output of the differential light detection stage is applied to the input of a servo motor control system 240, more completely shown in FIG. 6, the differential light input being indicated at the input of an analog switch 242c.

The various modes of operation of the servo stage are controlled by search track mode logic, as shown in more detail in FIG. 5, an which will now be more completely described before actually setting forth the various specific operation and details of the servo control 240.

Up to now we have assumed that power has been available for all of the stages discussed having been made available by depressing the start switch 140 located on the rod housing. This applies power through two circuits: first, through diode 244 which energizes all of the circuitry; and also sends a positive signal to the input of a power control latch 246 which consists of components and suitable logic for maintaining the B+ in an "on" stage after the start switch has been released and until a stop signal is received by the latch, as will be explained. In addition, the start signal pulse is also applied to one input of a search/track control latch 248 and to one input of an up-down control latch 250. This start pulse energizes the up-down latch into an up state because the slider carriage is initially in a home or down position. The search/track latch is put into a search state which is indicated as track, i.e., the opposite of track, as will become apparent. The terms search and track are interchangeable and obviously result from logic considerations inherent in the circuitry. For convenience of explanation, the track or non-track functions will be described in the present text as "search" functions. In addition, the terms "search" or "searching" when used herein shall broadly refer to movement of the slider along the rod for coarse positioning where the photocells detectors are relatively close to the laser beam plane, whereas the terms "track" or "tracking" refer to slider movement for fine positioning and accurate centering on the beam plane.

While the normally home position of the slider carriage defines the initial relationships in the logic circuit herein, there are many applications particularly in measuring differential elevations where the slider will have stopped at a given position for indicating a measurement and will not have moved during the period in which the surveyor moves the rod from one location to another. Accordingly, if the difference in elevation is less than the span of a photo detector, i.e., approximately two inches, it would facilitate operation of the system if it were not necessary for it to be reset to zero and go through a total search mode in order to find the light pulses. Accordingly, the control circuitry includes a stutter-start circuit 252 which provides an initial time delay, of the order of ½ second, before initiation of the search mode in which the system remains in track mode and if a signal is received by the detector during the period, the search mode functions are bypassed and the system immediately tracks on the light beam. In this way the detector might only move a matter of an inch or so immediately when the pole is moved to the new location. This delay is provided by the diode, resistor, and capacitor combination 252, as shown in FIG. 6. If the beam hits one of the photocells, then immediately it causes track mode logic to go into operation. Otherwise, the up/down latch 250 puts out an up signal and the search/track latch 248 puts out a signal as will presently be discussed.

Referring now to FIG. 5, the up-down latch is indicated generally at 250 and consists of interconnected NOR circuit logic components connected as shown. The input to the up-down consists of limit switches 132, 134 as well as an initial start signal. The limit switches are normally closed and if they are open, as when they are struck by the slider carriage, they reset the latch to reverse itself so that the slider moves in the opposite direction. If the lower limit switch is struck after the up/down latch is in the down state, the up/down latch goes positive again and also provides an input to the stop logic NOR circuit which is one means of stopping the system. This occurs when the slider has traversed the pole to the top and then returned to the bottom without finding a signal. In this way, the system only operates through one search cycle and stops after that cycle if a signal has not been located.

During search mode, the up/down signal is routed to a switch 254 through which it passes to the motor servo system.

Attention is now more particularly directed to FIGS. 4 and 6 and to a description of the motor servo control 240 itself. The servo control basically comprises a loop having a time shared feature as follows. The motor 120 is controlled by a motor drive circuit 268. A sawtooth generator indicated at 260 supplies an output which increases with time and then drops to $V_h$. Whenever the motor is rotating there will be a back EMF produced by the motor. This signal is sensed in differential amplifier 264. All of the amplifier stages produce voltages which are referenced to $V_h$ which is one-half of B+. If there is a positive voltage from amplifier 266 which is higher than $V_h$ at some time, it will be higher than the sawtooth applied. The width of this motor drive signal is dependent upon how long the driving voltage from the loop amplifier 266 is greater than the sawtooth voltage from the generator 260. In other words, there is a small deviation from the center which defines $V_h$ and creates thereby a small pulse if there is a small deviation and a large pulse if there is a large deviation. During the retrace of the sawtooth generator, the drive is essentially turned off and amplifier 264 reads back EMF voltage across the motor in the absence of a driving voltage. This voltage is the velocity feedback signal, i.e., the reverse EMF of the motor. Switch 270 causes this voltage to be routed at the appropriate time to sample and hold circuit 272 which thereby preserves that velocity signal for the rest of the time when the motor is being driven, i.e., during that period of time when there is a feedback voltage present at the output of 264 but such would not be a valid velocity feedback signal. In this way, noise and other unwanted components on the velocity signal are not routed to the velocity sample and hold circuit 272, but during the appropriate time the velocity signal is sampled, held and routed back to the loop amplifier 266. In addition, the up/down signal is routed to the input 266a of loop amplifier 266 from the switch 254, input 266a serving as a summing junction so that the entire system tries to maintain a voltage constant at $V_h$. By way of example, if there is a positive voltage appearing and it is traced around the loop, it results in a negative response so that the loop balances the velocity of the motor to demand and thereby gives it zero voltage at the summing junction of loop amplifier 266. FIG. 6 shows the detailed logic circuits which are used to implement the foregoing, but it is not believed that explanation of these circuits, other than by way of that shown directly by the drawing, is necessary.

Thus, in summary in search mode a signal is received from the up/down latch which is positive for up motion and negative for down motion, and this signal is applied through switch 254 to one input of summing junction 266A. This demand signal is balanced by loop amplifier 266 during the time in which the velocity feedback is measured to derive the null during that period of time. When a null occurs, the sawtooth generator 260 drives the motor drive circuit 268 and the motor at the demand level. If a difference occurs, then the loop amplifier gain is changed to satisfy the demand and reset the system to null. In this way, the motor drives the slider through a search cycle. At the end of the cycle, the slider engages the lower limit switch 134 reversing the up/down latch to up state at which time the up signal passes through the stop circuit 274 and disengages the power control latch.

The following description will explain changes in the system whih are made when a track pulse is generated and received.

Referring now again to the block diagram of FIG. 4, it will be noted that each signal pulse when present is passed to the input of threshold detectors 276 and 278 which will provide an output whenever the input variation exceeds a pre-determined threshold level. If the output of both threshold detectors is present, their output will be passed through a NAND gate 280 to the input of both a count control latch 282 and to the input of a counter 284, hereinafter to be more completely described. If either cell is hit, or both, an output will be passed through a NOR gate 286 to a track pulse timer 288, the search/track latch 248 and to missing pulse timer 253. Missing pulse timer 253 is set to generate an output signal when no pulses are detected for a pre-determined time, preferably two seconds, and such output signal switches search/track latch 248 to search mode and up/down latch to up mode. It is the purpose of the count control latch 282 and the counter 284 to establish a time interval for varying the gain of the system during the track mode so that the system settles on an accurate position which is such that the gap and the small portion of the detectors which are both being impinged upon by the pulsating beam slowly settles on an exact midposition. Accordingly, these circuits are not energized unless NAND gate 280 provides an output which only occurs if both photocells are being energized. On the other hand, if, in search mode, one of the photocells is energized, the NOR gate 286 provides an output to switch the system from a search mode to a track mode. The NOR gate also provides an output when both cells are hit so that the system remains in track mode.

Simultaneously, the track pulse is developed by track pulse timer 288 as a pulse of a certain width which is applied to an input of an intergrator 290. Integrator 290 receives the differential light signal through switch 242 and tends to charge it to a certain voltage value. Integrator 290 was previously shorted during the search mode by swiich 292. The output of integrator 290 is applied to the summing junction 266A and now constitutes the velocity command signal. The motor and velocity feedback signal resonds through an inverting amplifier 294 having a unity gain to also apply a feedback voltage to the other input of inegrator 290 which tends to cancel out the signal placed on the integrating capacitor by the track pulse. In other words, the track pulse causes the output of the integrator to be charged up to a certain voltage which is then discharged by the velocity feedback system. This discharge voltage is equal to the velocity times the time interval; that is to say, the distance moved. In this way, the circuit has controlled the distance that the servo system will move the motor by giving up a pulse of a certain width and certain height to the junction of integrator 292. Thus, as the beam is acquired and one of the detectors is hit, the servo moves toward the center of the beam to a point where both detectors are hit. The track pulse timer is also responsive to the count control latch 282 and counter which are both energized when both cells are hit. At that point, the width of the track pulse is reduced to a factor of 1/2. In this way the response sensitivity of the servo system is reduced by the same factor. This reduction in gain provides the first part of an averaging or smoothing action so that the system tends to approach the center of the beam and perturbations such as are caused by atmospheric conditions which may cause the beam to vary position randomly are not followed with as high a gain. During this same interval, the counter 284 starts to count to a level of 16 successive hits, with the count control latching maintaining the system in a particular state. The counter only counts when both cells are hit, that function being accomplished by the NAND circuit itself. However, after eight counts have been counted by the counter, a "count 8" signal is provided from the track pulse timer to reduce its gain to 1/4 of its original value. If the system is viewed as having an oscillator and it were desired to obtain an perfectly critically damped state, it would require continuous reducton in gain. However, it has been found that the present system provides adequate damping which when considering other constraints approaches that of the critically damped condition in step fashion. After the counter reaches the count of sixteen counts, it provides an output stop pulse which is passed through the stop circuit 274 and turns the system off with the slider accurately centered on the plane of the laser beam.

In summary, the internal operatin of the grade rod is illustrated generally by the flow chart of FIG. 7. Laser beam generator 12 is set up and operated to project a rotating laser beam 14 in a level plane, with the rotational speed being set at a pre-determined rate, for example five cycles per second. The operator then places rod 10 in a vertical orientation resting upon the initial elevation 11. Prior to activation, slider 56 is in its home position lowermost of the rod. The system is activated by depressing pushbutton 140 and this switches the up/down latch 250 to the up mode and also switches the search/track 248 latch to the track mode for a pre-determined time delay, preferably 1/2 second. If a light signal is detected during this time delay the system immediately tracks and centers the slider on the beam. If no signal is thus detected the search/track latch is switched to the search mode.

In the search mode the servo circuit of the control circuit operates motor 120 at a controlled rate under influence of the velocity feedback loop from the motor to drive pulley 62 in a direction which moves the slider upwardly at a relatively high speed along the outer run of the tape. When the slider moves across the plane of the laser beam a light pulse hits one or both of the photocells 100, 102. The active loads coupled with the photocells in the printed circuit 104 carried by the slider discriminate against any DC signal components due to ambient sunlight and respond to the AC signal components due to the modulated laser beam so as to generate output pulse signals.

When an output pulse signal from either photocell circuit is received from NOR gate 286, the search/track latch is switched to the track mode which in turn actuates track pulse timer 288. The track pulse timer operates the motor servo control 240 to generate a velocity command signal which operates motor 120 to move the slider at lower speed compared to the search mode speed. The count control latch 282 is set when the first simultaneous output pulse from both photocells is received from NAND gate 280, and the count control latch in turn sets counter 284 for counting the number of simultaneous light pulse hits on both photocells.

In the track mode the velocity command signal is directionally coded so as to turn pulley 62 in the required direction for moving the slider to a centered position on the laser beam. The amplitudes of the output signals from the two photocells are directed through differential amplifier 230. The output signal from the differential amplifier is then modulated by track pulse timer 288. The moduiated pulse signal is integrated in integrating circuit 290, the output of which is regulated by the velocity feedback loop circuit 240 and directed to drive motor 120. The gain of the track pulse timer is reduced in stages as simultaneous pulses are counted.

Counter 284 is set to generate a stop signal when 16 simultaneous pulse hits are counted, and the stop signal is directed through stop circuit 274 to turn off power control latch 246, thereby stopping slider 56 at a centered position. Prior to power shutoff, an alarm circuit 247 is activated by the latch 246 energize audio buzzer 144 for a short time period to provide an alert signal indicating that the slider has been centered so that the instrument can then be read.

If no light pulse hits either photocell during the upward excursion of the slider, upper limit switch 132 is activated by the slider and this switches up/down latch 250 to its down mode. The output from the up/down latch directs a velocity command to the servo circuit which is effective to reverse the direction of motor 120 and move the slider and tape downwardly. If again no light pulse hits a photocell during the downward excursion of the slider then the lower limit switch is activated and this switches up/down latch 250 to its up mode which provides an input stop pulse to stop circuit 274.

If during the track mode the incident laser beam is interrupted for any reason the control circuit operates to again cycle slider 56 back and forth along the rod in the search mode, thereby assuring that false readings are not taken. Missing pulse timer 253 is set to generate an output signal when no pulses are detected for a pre-determined time period, preferably two seconds. An output signal from the missing pulse timer switches the system to the search mode, with the up/down latch switched to up mode, so that the slider will resume its cycle of searching until a light signal is reacquired or until the slider is stopped, as previously described, in its home position.

The method of use and operation of the invention will be described in connection with FIG. 8 which illustrates a perspective view of the grade rod 10. In this illustration the rearwardly facing housing side 28 is shown as folded through 180° so as to more clearly indicate the relationship of the underlying fixed scale 41 with respect to the scale 40 on side 26 as well as the scale on flexible tape 50.

In use and operation, the invention broadly measures or locates the elevation or position of any point or physical structure from the laser beam plane. The elevation or location of the laser beam plane in turn can be determined with respect to a given reference location, which may be a bench mark having a known elevation. As used in this application the term elevation will mean, for simplicity of description, the perpendicular distance of a point, location or structure from the laser beam plane. While the invention will generally be described as employing methods in which the laser beam plane is horizontal, such plane could be oriented vertically or at any desired graded angle.

The invention provides a method of measuring or checking direct elevations of any number of locations within the range of the laser beam. Examples of this method would include setting footing batterboards or screeds at a construction site, locating "four foot marks" in each floor of a high rise building, setting sewer line hubs, checking the fine grade of a road bed, or checking the level of concrete finish, and the like. With the laser generator set up and operating to project its rotating beam in a level plane, the grade rod 10 is set up vertically on an initial reference point having a known elevation, such as a bench mark or other local monument 11 as shown in FIG. 1. The rod's control system is then activated by operating pushbutton 142 and the slider 56 automatically moves to center on the laser beam plane. The cursor 20 is then manually moved along the rod so that its fiducial mark is in register with the slider indicators. The cursor is left in this position for the remainder of the readings. The rod is then carried and set up vertically at the first location 13 whose elevation is to be measured or checked. Pushbutton 142 is again operated and the control system in turn moves the slider to center on the beam plane. The scale of flexible tape 50 is then read below its intersection with the fiducial mark of the cursor, and this reading is the differential elevation Δh at the first location 13 from the initial reference point. If desired, this differential elevation can be added to the reference points known elevation to determine the absolute elevation of the first location. This procedure is repeated at each subsequent location. Should the beam plane at any location be too low to intersect the slider, i.e., below the slider's home position, then the rod can merely be turned end for end with its upper end 42 set on the location. The rod is then operated as described to determine the differential elevation, although the cardinal numbers on the scale would be read upside down.

Overhead locations can also be measured or checked by the invention using similar procedures. For example, in measuring the sag of an overhead deck or ceiling the rod is set vertically with its upper end against a reference portion of the deck or ceiling. The control system is activated as described to center the slider on the beam plane, and the cursor is brought into register with the slider indicator. The rod is then moved, set up and activated at other portions of the deck or ceiling, and the amount of sag at each point is read directly at the intersection of the cursor with the scale on tape 50.

The invention further provides a method for measuring or checking horizontal distances from a given reference, as for example in setting partitions or plumbing along an offset line at a construction site. A laser beam is rotated in a vertical plane along the desired direction. Rod 10 is then positioned along a horizontal axis across the beam plane and one end of the rod is aligned with an initial known reference location. The control system is activated so that the slider centers on the beam plane, and the cursor is then moved into register with the slider indicators. The rod is moved and set horizontally at the first location to be measured or checked and the control system is again activated to center the slider on the beam plane. The differential distance between the reference location and the first and each subsequent location is then read at the intersection of the cursor on the scale of tape 50.

The method of use of the invention includes a procedure in which one or more locations are to be established at a given differential elevation from the laser beam plane where the elevation of that plane has been previously established. Laser beam generator 12 is set up and operated to project the rotating laser beam in a horizontal plane in the manner illustrated in FIG. 1. Grade rod 10 is held vertically at the first location which is to be measured or established. The control system is then actuated so that the slider automatically centers on the laser beam plane. The desired differential elevation of the first location from the beam plane is then read on the scale of tape 50 which is thereby referenced to the local structure which is to be set or measured. For example, assume that a four foot mark on a wall is to be set at +1.00 foot above the reference beam plane. With the grade rod held vertically adjacent the wall and with the slider detector centered on the beam plane in the position shown in FIG. 8, the four foot mark on the wall is set adjacent the 1.00 foot mark on the upper portion of scale 50.

Another method for setting up a physical object such as a wall or frame at a desired elevation with respect to a given reference includes initially affixing one or more grade rods 10 to the structure by suitable fasteners, clamps or the like. For example, a pair of the grade rods 10 could be affixed in upright position onto opposite corners of a wall with each rod being referenced on the wall, such as by aligned each rod upper end flush with the top of the wall. Using the laser beam plane as the given reference, the control circuits on the grade rods are activated so that their respective sliders center on the beam plane. The position of either of the indicators 94 is read on the respective scales 40 of each rod, and this provides a measurement of the differential elevation of the wall top above the beam plane. As required, the ends of the walls are jacked up or down until the desired differential elevation reading is observed on the scales. The wall is then affixed to the foundation or other local structure and the grade rods are removed.

From the foregoing it is apparent that there has been provided a novel automatic grade rod and method of operation which is productive of many improvements and advantages over existing devices and procedures. The grade rod is a compact, self-contained unit which can be easily handled and used in the field by a single operator in combination with a rotating laser beam. Many different locations, points and structures in surveying and in the construction industry can be easily and quickly measured, set up or checked by means of the grade rod and method of operation. The grade rod has a relatively wide acceptance angle capability for detecting a laser beam, and the rod can be used where the beam plane is either horizontal, vertical or at any graded angle. The control circuit of the grade rod readily discriminates between ambient sunlight and the rotating laser beam so that expensive selective wavelength light filters are not required. The control circuit operates the slider and photocell detectors in a search mode for quickly finding the coarse position of the beam, and then in a track mode for fine centering of the slider on the beam. In the track mode the circuit provides averaging of the beam position to minimize refraction effects on the beam due to atmospheric perturbations. The control circuit in the track mode reduces the gain of the positioning signal in stages so that a beam centered position is quickly reached. Circuits are also provided to return and stop the slider at its home position should no light pulse be detected during search mode, or if a number of missing pulses are counted during the track mode, so that false readings are not made.

While the foregoing embodiments are at present considered to be preferred it is understood that numerous variations and modifications may be made therein by those skilled in the art. For example, while an elongate rod is illustrated, the structure which carries the movable slider and flexible tape can be of any desired configuration. Also while a rotating laser beam plane is illustrated, the beam could be swept back and forth through an arc or it could be projected in a flat arc with varying amplitude to provide beam modulation. It is intended to cover in this invention all such variations and modifications as fall within the true spirit and scope of the invention as expressed in the appended claims.

What is claimed is:

1. In a surveying and measuring system which includes means for projecting a modulated light beam in a plane, the combination of sensor means for sensing an incident modulated light beam, transport means for moving the sensor means from a given initial position along a path which crosses the plane of the light beam, control circuit means including means for demodulating a light beam which is incident on the sensor means and for generating a command signal responsive thereto, means responsive to said command signal for operating said transport means to remove the sensor means from the initial position toward said light beam and for centering the sensor means on the light beam, and means for moving the sensor means back to the initial position responsive to an interruption of the incident light beam on the sensor means for a pre-determined period of time.

2. In a surveying and measuring system which includes means for projecting a modulated light beam in a plane, the combination of sensor means for sensing an incident modulated light beam, transport means for moving the sensor means along a path which crosses the plane of the light beam, said transport means including means forming a graduated scale, and means for mounting said graduated scale for movement with the sensor means along said path, control circuit means including means for demodulating a light beam which is incident on the sensor means and for generating a command velocity signal responsive thereto, means responsive to said command velocity signal for operating said transport means to move the sensor means at a given velocity to a position in which the light beam is centered with respect to said sensor means, and means forming another graduated scale for indicating the position of said light beam with respect to said path.

3. In a surveying and measuring system which includes means for projecting a modulated light beam in a plane, the combination of sensor means for sensing an incident modulated light beam, transport means for moving the sensor means along a path which crosses the plane of the light beam, control circuit means including means for demodulating a light beam which is incident on the sensor means and for generating a command velocity signal responsive thereto, means responsive to said command velocity signal for operating said transport means to move the sensor means at a given velocity to a position in which the light beam is centered with respect to said sensor means, said sensor means including at least a pair of light detectors which are spaced-apart along said path, each light detector including means for generating an output pulse, means for counting the number of simultaneous output pulses from said light detectors, means responding to a simultaneous output pulse causing said velocity signal to have a given gain for moving said sensor means, means for reducing the gain of said velocity signal responsive to said counting means counting a pre-determined number of simultaneous output pulses from the light detectors.

4. A system as in claim 3 which includes means for terminating said velocity signal responsive to the counting of a pre-determined number of simultaneous output pulses from said light detectors.

5. A system as in claim 3 in which said projected light beam has a given beam width, and said light detectors are spaced apart along said path a distance less than said beam width.

6. A grade rod for use in surveying or measuring through the use of a modulated light beam which is projected in a plane, the combination of sensor means for detecting the modulated light beam, the sensor means comprising a pair of light detectors which are closely spaced-apart by a gap in a direction along the length of the rod, first means for moving the sensor means along the length of the rod in a search mode for initially detecting the light beam, second means for generating an output signal responsive to the initial detection of said light beam by said sensor means, said second means including a pair of circuit means for producing respective output pulse responsive to the detection of alternating current component of the output signal in respective detectors, third means responsive to said output signal for moving said sensor means along the rod in a track mode for centering the sensor means with respect to the plane of the light beam, said third means including circuit means for generating a differential signal proportional to the difference in amplitudes of the output pulses from each detector, said first means responding to said differential signal to move the sensor means in a direction to reduce an amplitude differential between the output pulses from the detectors, circuit means for terminating movement of the sensor means whereat said gap is at a centered position on the beam plane responsive to simultaneous output pulses being produced by the detectors, circuit means for counting the number of simultaneous output pulses from the detector, means for moving said sensor means toward the said centered position at a given velocity when initial simultaneous output pulses are counted, means for moving said sensor means toward the centered position at a fraction of said given velocity when a pre-determined number of said simultaneous output pulses are counted, and means for terminating said movement of the sensor means when a second pre-determined number of simultaneous output pulses are counted.

7. A grade rod as in claim 6 which includes circuit means for detecting the number of missed output signals which are not generated over a given period of time, and circuit means for moving said sensor means to said initial position responsive to the detection of a predetermined number of said missed output signals.

8. In a surveying and measuring system which includes means for rotating a modulated light beam in a plane at a given frequency, the combination of sensor means for sensing an incident modulated light beam, said sensor means including at least a pair of light detectors which are spaced-apart along said path, each light detector including means for generating an output pulse having an amplitude proportional to the energy of the light beam incident on a respective detector, transport means for moving the sensor means along a path which crosses the plane of the light beam, control circuit means including means for demodulating the light beam which is incident on the sensor means whereby the output pulses are generated, said circuit means including means for comparing the amplitudes of the output pulses from each light detector and generating a differential output signal, means for integrating said differential output signal with respect to time, means for generating a velocity command signal proportional to the integrated value of said differential output signal, means responsive to said velocity command signal for operating said transport means to move the sensor means at a given velocity to a position in which the light beam is centered with respect to said sensor means, means coupled with said transport means for moving the sensor means at a velocity proportional to said velocity command signal, and means forming a graduated scale for indicating the position of said light beam with respect to said path.

9. A method for determining the location of the intersection of the plane of a light beam on an elongate surveying rod which has a pair of light detectors which are closely spaced-apart along a gap, said detectors being mounted for conjoint movement with a graduated scale along the longitudinal axis of the rod, including the steps of moving the detectors and scale back-and-forth along the axis in a search mode for initial detection of said light beam, detecting the intersection of a light beam on at least one of said detectors and responding thereto to move said detectors and scale along the axis in a tracking mode wherein the distance between the plane of said light beam and the interface between said detectors is reduced, and terminating movement of said detectors and scale when the light beam is centered on the gap between the detectors.

10. A surveying rod for use in a surveying system which includes a light beam which is projected in a plane, the rod including the combination of an elongate housing adapted to be positioned to intersect said plane, means forming an elongate graduated scale, a pair of light detectors mounted on the scale means in closely spaced-apart relationship in a direction along the length of the housing, means mounting the scale and light detectors for conjoint movement back-and-forth along the length of the housing, and control circuit means operating responsive to the impingement of a light beam on the detectors for moving the scale to a position at which said light beam is centered between said detectors.

11. A surveying rod as in claim 10 in which said light beam has a given width, said light detectors are spaced apart a distance less than said given width, and said control circuit means includes means for sensing the simultaneous impingement of the light beam on the detectors, and means for moving the scale to a position at which said last mentioned means senses said simultaneous impingement.

12. A surveying rod as in claim 10 in which said means forming the graduated scale includes a flexible elongate tape, said pair of light detectors being mounted for movement with said tape, a pair of pulleys rotatably mounted in spaced-apart relationship within the housing, said tape being reeved around said pulleys, and said control circuit means includes drive means for rotating at least one of said pulleys.

13. A surveying rod as in claim 12 in which said control circuit means generates output signals responsive to the impingement of light beams on the detectors, a drive circuit for operating said drive means under influence of said output signals, and conductor means for conducting the output signals from the detectors to said drive circuit, said conductor means including a flexible elongate member mounted within the housing in a traveling loop, with one end of said loop being connected for movement with said light detectors and the other end of said loop being connected with said drive circuit.

14. A surveying rod as in claim 10 which includes means for forming a graduated scale which is fixed with respect to the housing, and a manually operated cursor mounted for movement along the fixed graduated scale to facilitate the measurement of differential vertical distances between the plane of said light beam and one or more locations at which said rod is set for taking measurements.

15. A surveying rod as in claim 10 in which said housing includes on at least one side thereof a transparent panel, said graduated scale means comprises a flexible elongate tape mounted within said housing for movement along the longitudinal axis thereof, with a side of said tape being formed with a graduated scale which is visible through said transparent panel, and said light detectors are mounted for movement with said tape.

16. A surveying rod as in claim 15 which includes means forming a graduated scale which is fixed with respect to the housing, together with indicator means carried with said light detectors for relative movement along the fixed scale for indicating the position at which the light beam intersects said fixed scale.

17. A surveying rod as in claim 16 in which, with said rod being held upright, the graduated scale on said tape increases in units in an upward direction, and said fixed scale on the housing increases in units in a downward direction.

18. A method of establishing a location or physical object at a pre-determined distance perpendicular from the plane of a modulated laser beam by means of an elongate scale which is mounted for movement with a modulated laser beam detector including the steps of moving said beam detector and scale conjointly along a path which intersects said beam plane transversely, detecting the intersection of the laser beam on the detector, aligning said beam detector on the beam plane of the beam, and establishing said location or physical object with respect to the portion of said scale which is at said pre-determined distance from said beam detector.

19. A method as in claim 18 in which said beam detector and scale are moved adjacent an additional location or physical object and repeating said steps of moving the detector and scale conjointly along a path which intersects said beam plane orthogonally, causing said beam detector to center on the beam plane, and establishing said additional location or physical object with respect to said portion of the scale.

20. A method of positioning a structure with respect to a given reference by means of an elongate rod which includes a laser beam detector and elongate scale which are mounted for conjoint movement along the rod, including the steps of affixing said rod at a known position on a portion of said structure, projecting a modulated laser beam in a plane which is fixed with respect to said reference, moving said detector and scale conjointly along said rod in a direction which transversely intersects said beam plane, detecting the intersection of the laser beam on the detector, aligning said detector on said beam plane and moving said structure and thereby said rod to a position at which said beam detector is at a pre-determined location along the length of said rod while maintaining the detector in alignment with the beam plane.

21. A method as in claim 20 in which a second portion of said structure is to be positioned with respect to said given reference, including the steps of affixing a second elongate rod to said second portion of the structure, said rod having a second laser beam detector and elongate scale mounted for conjoint movement along the rod, moving said second detector and scale conjointly along said rod in a direction which orthogonally intersects said beam plane, aligning said second detector on said beam plane, and moving said second portion of the structure and thereby said second rod to a position at which said second beam detector is at a pre-determined location along the length of the second rod.

* * * * *